United States Patent [19]

Engelhard

[11] 3,770,194
[45] Nov. 6, 1973

[54] THERMALLY ACTIVATED CONTROL SYSTEM

[75] Inventor: William E. Engelhard, Apalachin, N.Y.

[73] Assignee: Owego Heat Treat, Inc., Apalachin, N.Y.

[22] Filed: Apr. 28, 1972

[21] Appl. No.: 248,374

[52] U.S. Cl. .............. 236/15 B, 236/68 C, 219/492
[51] Int. Cl. ...................... G05b 11/32, G05d 29/30
[58] Field of Search .................. 236/15 B, 68 C, 78; 219/492

[56] References Cited
UNITED STATES PATENTS 3,075,130   1/1963   Bolmgren .......................... 236/68 C
2,148,491   2/1939   Moore .............................. 236/68 C Primary Examiner—William E. Wayner
Attorney—Harry Sommers et al.

[57] ABSTRACT

A furnace temperature control system including auxiliary signal generating means, the output of which is connected in parallel with the error signal derived from the furnace temperature sensor, the totality of said signals serving to activate and inactivate power feed for the furnace. The auxiliary signal is so generated and so tied to the switching means for furnace power that the combined error and auxiliary signals inactivate and activate power feed to the furnace at temperatures decreasingly displaced from a desired preset temperature, whereby to enable more rapid attainment of the desired equilibrium temperature.

5 Claims, 1 Drawing Figure

PATENTED NOV 6 1973  3,770,194
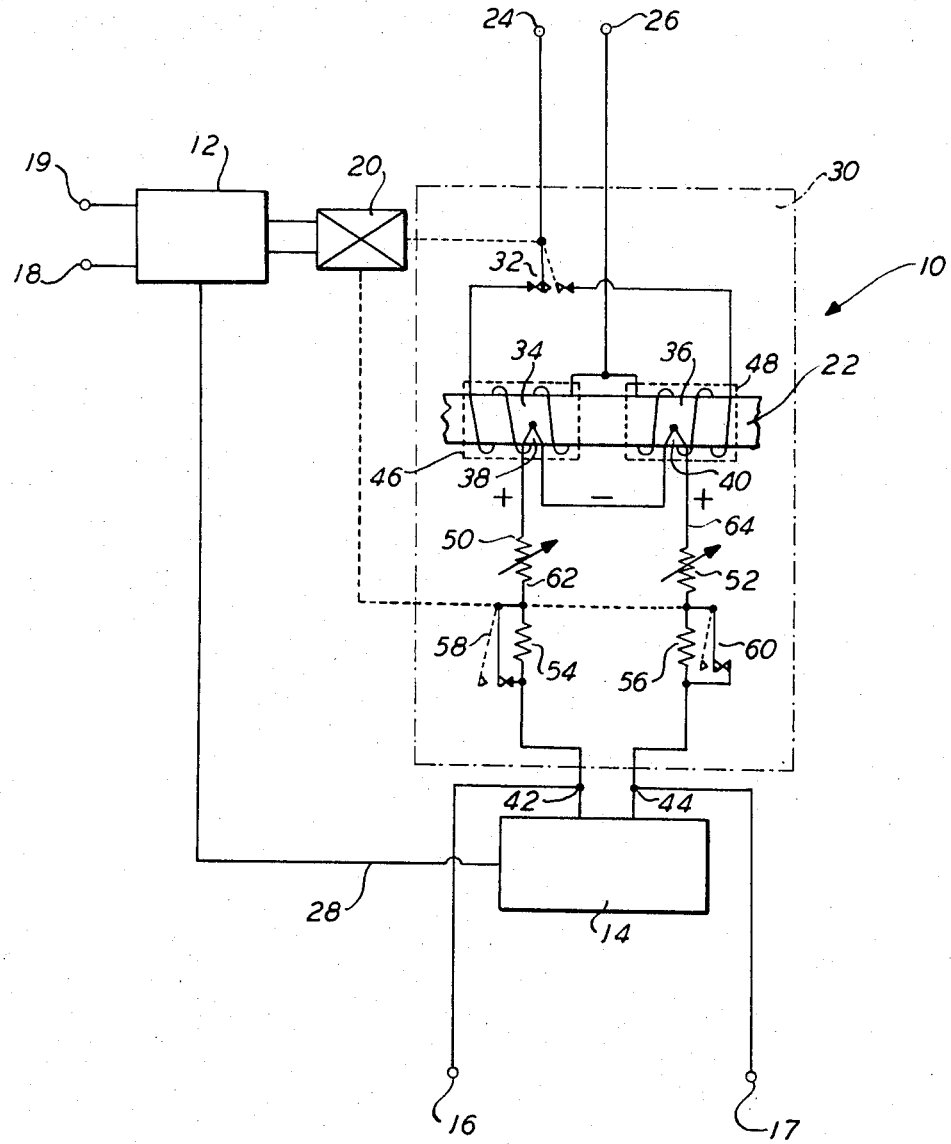

THERMALLY ACTIVATED CONTROL SYSTEM

BACKGROUND OF INVENTION

This invention relates generally to temperature controlling systems, and more specifically relates to systems for accurately controlling temperatures within industrial furnace environments.

In typical industrial furnace environments a simple two-position control device is utilized for purposes of regulating furnace temperatures. Considering, for example, a high temperature metallurgical furnace, a sensor — which typically comprises a thermocouple — is placed within the furnace environment and arranged in a suitable bridge circuit or the like. An error signal may then be derived from the bridge circuit which is indicative of the deviation of furnace temperature from a preselected temperature, such error signal serving in turn to control a relay or the like for switching power feed to the furnace.

In consequence of simple arrangements, such as is described above, it is found in practice that when such a furnace is initially activated it will start to heat, and energy will continue to be supplied to the furnace — e.g., via electrical or gas heating — until the sensor reaches the precise temperature preset at the control thermostat, at which point the furance will shut off. By this time, however, enough thermal head has been built up that in spite of the disruption of power the temperature will continue to rise above the control point; eventually, such temperature rise stops and the temperature moves in the reverse — downward direction. Again, however, the thermal lag will be such that the actual furnace temperature will now drop below the preset temperature — in spite of power activation at the control point. Again the temperature eventually turns around, this swinging cyclic movement above and below the control point thereafter being indefinitely repeated. As a result of this process accurate temperature control is not readily achieved and extended periods of time are required to attain anything resembling an equilibrium temperature.

In accordance with the foregoing, it may be regarded as an object of the present invention, to provide a furnace temperature control system which enables rapid and accurate attainment of a desired preset control temperature.

It is a further object of the present invention, to provide a furnace temperature control system which enables very rapid attainment of a preset temperature, which minimizes temperature oscillations about such temperature, and which achieves such results through use of simple, rugged, relatively inexpensive, and highly dependable elements.

Now in accordance with the present invention, the foregoing objects, and others, are achieved through use of an auxiliary signal generating means having its output connected in parallel with the error signal derived from the furnace temperature sensor, the totality of said error and auxiliary signal serving to activate and inactivate power feed for the furance, The auxiliary signal is so generated and so tied to the switching means for furnace power that the combined error and auxiliary signals inactivate and activate power feed to the furance at temperatures decreasingly displaced from the desired preset temperature, whereby rapid attainment of the desired equilibrium temperature is achieved.

BRIEF DESCRIPTION OF DRAWINGS

The invention is diagrammatically illustrated, by way of example, in the appended drawing, in which:

The FIGURE schematically depicts a temperature control system in accordance with the invention.

DESCRIPTION OF PREFERRED EMBODIMENTS

In the FIGURE a temperature control system generally designated at reference numeral 10 is shown. The system may for purposes of illustration be assumed to be associated with a high temperature furnace or the like. The primary temperature sensor for such furnace is not explicitely shown, but may be regarded as a conventional thermocouple. Such thermocouple will typically be connected in a bridge or potentiometer circuit or the like, from which device an error signal is derived indicative of the temperature in the furnace. Such error signal will enter the system 10 at the terminals 16–17 which are seen to connect to detector 14. Detector 14 may, for purposes of illustration comprise a mechanical or electronic null detector, i.e., may be a conventional galvanometer-type instrument or an electronic amplifier.

Detector 14 is connected back to control circuit block 12 via the control line 28. Block 12 is fed from power lines 18–19 and contains an on-off control for the overall system, as well as conventional switching elements or the like to activate and inactivate power feed to the furnace in response to signals from detector 14. In particular, circuit block 12 is connected to holding-on relay coil 20, which may be regarded as the relay which specifically controls furnishing of electric or gas heating energy to the furnace.

Holding-on relay coil 20 is ganged with a two-position switch 32 contained within the auxiliary signal generating means generally designated at 30. The latter (means 30) is seen to include a pair of terminals 24–26 for application of electrical power to a pair of heater coils 34 and 36 wound upon a heat equalizing conductor 22 and a pair of series-connected opposing thermocouples 38 and 40 having outputs at terminals 42–44 to provide a signal in parallel with the error signal at terminals 16–17.

Although means for achieving same are not explicitly shown, it may be assumed that power to terminals 24–26 is present whenever the furnace is operating, regardless of whether thermal energy is being fed tothe furnace — i.e., regardless of the position of relay 20. Under such conditions one or the other of coils 34 and 36 will be activated. Such coils are seen to form more generally part of the heaters 46 and 48 which are respectively at opposite ends of a heat equalizing conductor 22. The latter is shown diagrammatically as a metallic tube of copper or the like about which the encircling heaters 46 and 48 are positioned. Conductor 22 thus acts to rapidly spread heat from one end thereof to the other, but depending upon which heater is energized, one localized portion or the other of conductor 22 will be at a higher temperature. In turn, the position of switch 32 will determine which of the heaters 46 and 48 is activated, one such heater being "on" when the furnace is being fed thermal energy and the other being "on" when feeding of such energy is switched off.

The pair of thermocouples 38 and 40 are seen to be positioned in contact with the surface of conductor 22 in the direct vicinity of the heaters 46 and 48. Thermocouples 38 and 40 are conventional identical devices and are connected in series opposition — as is suggested by the polarity signs in the FIGURE. The output from the thermocouples is taken at terminals 42–44, where it is fed to detector 14 in parallel with the error signal from terminals 16–17.

With the aid of the foregoing, the general operation of the present device may be readily comprehended. In particular, it will be evident that the auxiliary signal present at terminals 42–44 due to thermocouples 38 and 40, will be of a magnitude and polarity determined by the difference in temperature of the two thermocouples. Ignoring for a moment the functions of variables resistors 50 and 52 and of limiting resistors 54, 56 and associated shorting bars 58 and 60, it will thus be evident that with thermocouples 34 and 36 at a common temperature, no auxiliary signal will be produced in that the bucking action of the thermocouple's outputs cancel one another's effect. However, the non-equilibrium situation will find one end or another of conductor 22 at a higher temperature, in consequence of which a detractive or additive auxiliary signal will be produced by generating means 30 and passed to terminals 42–44.

Thus, for example, when the relay 20 is initially activated to add thermal energy to the furnace, the switch 32 will be placed in the position shown and will energize heater 46 to preferentially heat thermocouple 38. The heat energy flowing through conductor 22 will be sufficient that the temperature difference between thermocouples does not become excessive, but nevertheless a "detractive" signal is applied by generating means 30, which signal combines with the error signal from the bridge circuit so as to present detector 14 a total signal which is somewhat closer to the null valve that detector 14 is set for than would be achieved were means 30 not present. In consequence relay 20 will be inactivated somewhat below the thermostatically set temperature. Conversely with switch 32 in the "dotted" position of the FIGURE, heater 48 is energized to eventually generate auxiliary signal of relative polarity opposite to that present where heater 46 is operative. This signal is thus "additive" with respect to the error signal at 16-17 and its effect is to cause relay 20 to activate — i.e., to switch "on" the feeding of thermal energy somewhat before the actual temperature in the furnace reaches the preset value. It will be appreciated that because of the thermal ballasting effect of conductor 22, the mere switching of switch 32 does not instantly render the auxiliary signal of opposite polarity. This result is beneficial in that an ever-decreasing damping of temperature oscillations about the present temperature occurs until the final equilibrium temperature is reached.

The variable resistors 50 and 52, previously referred to, may be used to provide compensation in the branches 62 and 64 of the thermocouple circuit for the fact that the rate of temperature increase in the furnace may be — and usually is — dissimilar from the rate of temperature fall in the furnace. Limiting resistors 54 and 56 are present in each branch 62 and 64, together with associated shorting bars 58 and 60 activated by a control gauged with relay 20. When the output at terminals 42–44 is low, shorting bars 58 and 60 will be in the closed position shown in the FIGURE; when such output reaches a sufficient level, the bars swing to their dotted position, throwing in the limiting resistors 54 and 56 to appropriately load and protect the circuit.

While the present invention has been particularly described in terms of specific embodiments thereof, it will be evident in view of the present disclosure, that numerous variations upon the invention are now enabled, which variations are in propriety yet within the scope of the present teaching. Accordingly, the invention is to be broadly construed and limited only by the scope and spirit of the claims now appended hereto.

I claim:

1. In a furnace temperature control system of the type including switching means for controlling application of heat energy to said furnace, temperature sensing means in said furnace, means to derive an error signal from said sensor in accordance with the temperature sensed, and detector means coupled to said error signal, and to said switching means for activating and inactivating said switching means in accordance as whether the signal received by said detector means corresponds to a temperature at said sensor below or above preset temperature, the improvement comprising:

auxiliary signal generating means having its output connected to said detector means in parallel with the error signal provided thereto, said means being connected to and activated by said switching means to provide to said detector means an adjusting signal of such magnitude and polarity as to augment or diminish the total signal to said detector in accordance with whether said switching means is positioned to apply or withhold energy from said furnace, said generating means including means for decreasing the magnitude of said adjusting signal on successive operations of said switching means, whereby said switching means is activated at temperatures decreasingly displaced above and below said present temperatures to enable rapid attainment of said desired temperature in said furnace.

2. Apparatus in accordance with claim 1, wherein said auxiliary signal generating means comprises a pair of thermocouples connected to series opposing fashion, said thermocouples being physically spaced from one another and in thermal contact with a common heat conductor, the output from said pair of thermocouples comprising said auxiliary signal; and heating means for applying heat to portions of said heat conductor adjacent one or the other of said thermocouples in accordance with the position of said switching means.

3. Apparatus in accordance with claim 2 wherein said heating means comprises an electrical heating element wound upon a metallic core, said thermocouples being in contact with spaced portions of said core, said core comprising said heat conductor.

4. Apparatus in accordance with claim 3, further including a variable resistance in series with, respectively, each of said thermocouples for balancing the output from said pair.

5. Apparatus in accordance with claim 4, further including limiting resistors in series with, respectively, each of said thermocouples, and a solenoid operated resistor shorting bar activated by a signal from said sensor means for shorting each of said resistors when the output from said sensor falls below a predetermined value.

* * * * *